US012724470B2

(12) United States Patent
Puthenparambil et al.

(10) Patent No.: US 12,724,470 B2
(45) Date of Patent: Sep. 1, 2026

(54) PROFILING OF DEVICES POWERED THROUGH POWER OVER ETHERNET FOR DEVICE SECURITY

(71) Applicant: Palo Alto Networks, Inc., Santa Clara, CA (US)

(72) Inventors: Jeslin Antony Puthenparambil, Santa Clara, CA (US); Ramakrishnan Sankaranarayanan, Pleasanton, CA (US); Suryakant Devangan, San Jose, CA (US); Ashwini Ulhas Borikar, Livermore, CA (US); Arun Athrey Chandrasekaran, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 172 days.

(21) Appl. No.: 18/361,251

(22) Filed: Jul. 28, 2023

(65) Prior Publication Data

US 2025/0039005 A1 Jan. 30, 2025

(51) Int. Cl.
*G06F 1/26* (2006.01)
*H04L 12/10* (2006.01)

(52) U.S. Cl.
CPC .............. *G06F 1/266* (2013.01); *H04L 12/10* (2013.01)

(58) Field of Classification Search
CPC ................................. G06F 1/266; H04L 12/10
See application file for complete search history.

(56) References Cited

U.S. PATENT DOCUMENTS 9,860,257 B1 * 1/2018 Kumar ................ G06F 11/3006
11,483,339 B1 * 10/2022 Kaimal ............... H04L 63/1416
2006/0143583 A1 * 6/2006 Diab ..................... G06F 1/3209 713/300
2010/0293398 A1 * 11/2010 Diab ................ H04L 12/40045 713/300
2014/0245054 A1 * 8/2014 Hamdi .................... H04L 43/08 713/340
2014/0365805 A1 * 12/2014 Balasubramanian ... H04L 12/10 713/340

(Continued)

OTHER PUBLICATIONS

Power over Ethernet (Year: 2022).*

(Continued)

*Primary Examiner* — Kim Huynh
(74) *Attorney, Agent, or Firm* — Gilliam IP PLLC

(57) ABSTRACT

Profiles of powered devices (PDs) are created based on monitoring device attributes and power consumption trends for connected PDs. An agent executing on power sourcing equipment (PSE) determines device attributes of connected PDs per port based on data received on each port of the PSE on which a PD is connected. The agent communicates device attributes determined for each port to a service that builds and maintains profiles for connected PDs. As the agent periodically reports monitored power consumption of connected PDs, the service tracks power consumption trends for each PD in association with the PD's profile. If the service detects deviations from the profile of a PD based on additional data received on the corresponding port that are reported by the agent, including substantial deviations from the power consumption trends and/or deviations from device attributes, the service generates alerts for the PD and port combination.

20 Claims, 6 Drawing Sheets

(56) References Cited

U.S. PATENT DOCUMENTS

| | | | | |
|---|---|---|---|---|
| 2016/0370850 | A1* | 12/2016 | Hamdi | G06F 1/3296 |
| 2019/0354681 | A1* | 11/2019 | Hauser | G06F 21/81 |
| 2022/0057851 | A1* | 2/2022 | Yam | H04L 12/10 |

OTHER PUBLICATIONS

Juniper Networks, "Monitoring and Troubleshooting PoE", [online], [retrieved on Jul. 19, 2023] Retrieved from the Internet: <https://www.juniper.net/documentation/us/en/software/junos/poe/topics/topic-map/poe-ex-series-monitoring.html>, Nov. 21, 2022.

* cited by examiner

PROFILING OF DEVICES POWERED THROUGH POWER OVER ETHERNET FOR DEVICE SECURITY

BACKGROUND

The disclosure generally relates to network architectures or network communication protocols for network security (e.g., CPC subclass H04L 63/00) and to security arrangements for protecting computers, components thereof, programs, or data against unauthorized activity (e.g., CPC subclass G06F 21/00).

Power over Ethernet ("PoE") technologies provide for both sourcing of power and transmission of data over Ethernet cabling. With PoE, power sourcing equipment ("PSE") sources power over an Ethernet cable to a PoE-enabled device to power the device. The Ethernet cable via which the PSE powers the device also provides a data connection between the PSE and the device. Examples of PoE-enabled devices include wireless access points ("APs") and Voice over Internet Protocol ("VOIP") technologies. Implementations of PoE can vary, though several Institute of Electrical and Electronics Engineers ("IEEE") standards for PoE have been developed. These IEEE standards include 802.3af (the original IEEE PoE standard), 802.3at, and 802.3bt.

Link Layer Discovery Protocol ("LLDP") runs on Ethernet-connected devices, including those of PoE systems, for transmission of information about the connected devices. LLDP is a link layer protocol in the Internet protocol suite. The protocol data unit ("PDU") of LLDP comprises a header and one or more Type-Length-Value ("TLV") attributes. TLVs comprise type, length, and value fields. The type and length fields that precede the value field of a TLV indicate the type of information included in the value field and the length of the value field. LLDP supports mandatory, optional, and custom TLVs.

BRIEF DESCRIPTION OF THE DRAWINGS

Embodiments of the disclosure may be better understood by referencing the accompanying drawings.

DESCRIPTION

Figure 1:
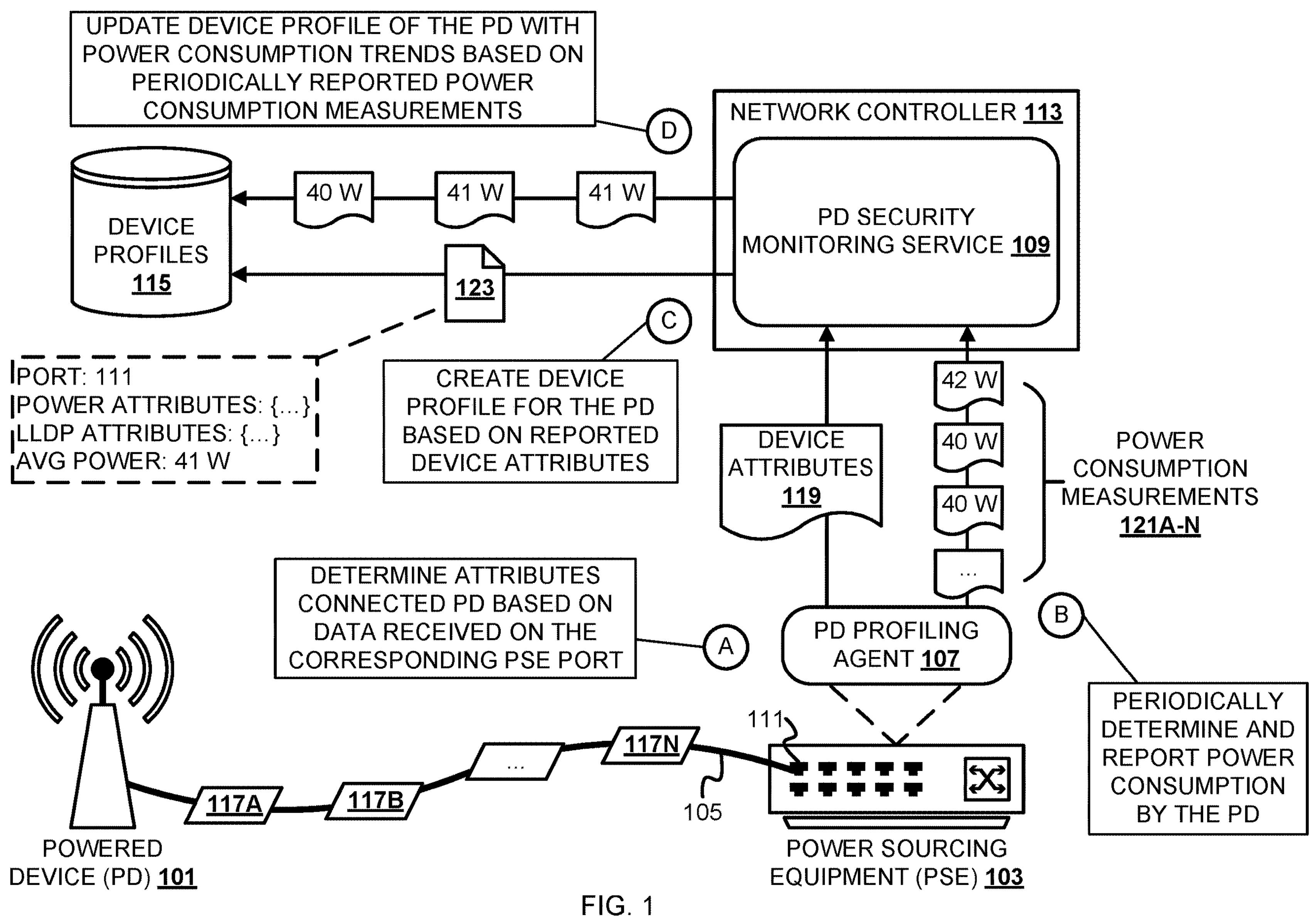
FIG. 1 is a conceptual diagram of building a profile of a powered device (PD) based on data received on a corresponding port of PSE.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses various terminology related to PoE standards. When referring to "power sourcing equipment," this description is referring to a device that sources power to a PoE-enabled device via Ethernet cabling to power the PoE-enabled device. When referring to a "powered device" ("PD"), this description is referring to a device powered via Ethernet cabling. Powering of PDs by PSE according to PoE can be according to one of a plurality of standard or non-standard (e.g., proprietary) implementations.

This description uses the term "PDU" to refer to a single unit of information transmitted between a source and a destination in network communications. A PDU is formatted in accordance with its associated communication protocol, and PDU formats vary across communication protocols at different layers in the protocol stack. For instance, a PDU can encompass a frame, a packet, and/or a segment/datagram for link layer/data link layer communication protocols, Internet layer/network layer communication protocols, and transport layer communication protocols, respectively.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Attackers can breach a network via its PDs, such as by replacing a PD with a malicious device that may spoof device attributes carried within data transmitted via Ethernet cabling (e.g., LLDP PDUs). Attempts to detect breaches based on monitoring static device attributes indicated in received data alone may thus be unreliable. Disclosed herein are techniques for building profiles, also referred to herein as "fingerprints," of PDs in a network based on monitoring device attributes and power consumption trends for connected PDs. An agent executing on PSE determines device attributes of connected PDs per port based on data received on each port of the PSE on which a PD is connected. The agent communicates the device attributes determined for each port to a PD security monitoring service that builds and maintains profiles for each connected PD. The agent also monitors power consumption for each port having a PD connected and reports power consumption measurements to the profiling manager. The security monitoring service tracks power consumption trends for each PD in association with the PD's profile. Reporting of power consumption measurements by the agent is ongoing so that the security monitoring service can monitor for variations in power consumption that deviate from the trends observed for a PD that are represented in its profile. As the security monitoring service detects deviations from the profile of a PD based on additional data received on the corresponding port, including substantial deviations from the power consumption trends and/or deviations from device attributes recorded in the profile, the security monitoring service generates alerts for the PD.

Different types of profile deviations may have different underlying causes. For instance, a deviation in device attributes identified from data received on a port may be attributable to disconnection of the prior PD and replacement with a new PD being powered by the PSE. The security monitoring service can indicate in generated alerts if the device attributes in addition to observed power consumption of a PD deviate from the profile recorded for the corresponding port to indicate that the "known" PD for the port has been disconnected. The profiling manager can flag substantial deviations from power consumption trends reflected in a PD's profile that are not accompanied by changes in software-level device attributes (e.g., LLDP attributes) as a potential security issue since this may be attributable to connection of a malicious PD that spoofs software-level device attributes of the prior PD. Further investigation and any corrective action as needed can then be performed to determine if the substantial power consumption deviation is attributable to expected activity (e.g., a software update of a PD) or a malicious PD being connected. Connection of a malicious PD that spoofs device attributes of the prior-connected PD can thus be detected, which may otherwise have gone undiscovered when monitoring static device attributes identifiable from data received on Ethernet ports alone.

Example Illustrations

FIG. 1 is a conceptual diagram of building a profile of a PD based on data received on a corresponding port of PSE. A PD 101 is connected to PSE 103 that comprises a plurality of Ethernet ports. In this example, the PSE 103 is depicted as an Ethernet switch and the PD 101 is depicted as a wireless AP, though other PoE-enabled devices can be utilized in embodiments. An Ethernet cable 105 connects the PD 101 to the PSE 103 on a port 111 of the PSE 103. The PSE 103 powers the PD 101 via the Ethernet cable 105, and data are also passed between the PD 101 and the PSE 103 over the Ethernet cable 105. Passing of power and data between the PSE 103 and PD 101 via the Ethernet cable 105 is according to PoE. PoE can be implemented for powering of the PD 101 by the PSE 103 according to one of the various IEEE standards defined for PoE or according to a non-standardized (e.g., proprietary) PoE implementation.

A PD profiling agent ("agent") 107 executes on the PSE 103. The agent 107 determines device attributes and power consumption of PDs connected to the PSE 103 based on data received on ports of the PSE 103. The agent 107 communicates with a PD security monitoring service ("service") 109 that executes on a network controller 113. The network controller 113 may be a software-defined wide area network (SD-WAN) controller. The agent 107 and the service 109 can communicate over a secure communication channel established therebetween.

FIG. 1 is annotated with a series of letters A-D. Each letter represents a stage of one or more operations. Although these stages are ordered for this example, the stages illustrate one example to aid in understanding this disclosure and should not be used to limit the claims. Subject matter falling within the scope of the claims can vary from what is illustrated. Additionally, the stages corresponding to the representative letters do not necessarily occur sequentially. For instance, the operations corresponding to stages B and D may be ongoing.

At stage A, the agent 107 determines attributes of the PD 101 connected to the PSE 103 based on data received on the port 111. FIG. 1 depicts data 117A-N sent over the Ethernet cable 105 that the PSE 103 receives on the port 111. The data 117A-N can include hardware-level power data communicated over the Ethernet cable 105 (e.g., wattage) during a PoE handshake between the PD 101 and PSE 103 and/or LLDP PDUs transmitted by the PD 101 to advertise its identity, capability, and neighbor information. The agent 107 analyzes the data 117A-N to determine device attributes 119 for the PD 101. The device attributes 119 comprise hardware-level power attributes of the PD 101 that the agent 107 determines based on the PoE handshake and/or software-level attributes of the PD 101, such as identity, capability, and neighbor information that the agent 107 determines based on LLDP PDUs.

Data transmitted over the Ethernet cable 105 and delivered on the port 111 are depicted as data 117A-N to aid in understanding and to illustrate that the device attributes 119 can be determined from different types of data (e.g., hardware-level and software-level data). For instance, determination of those of the device attributes 119 corresponding to power attributes is based on those of the data 117A-N received during and/or following the handshake between the PSE 103 and PD 101 (e.g., during the detection/classification stages and/or after powering on of the PD 101). For instance, the agent 107 can determine power attributes based on a classification of the PD 101 into a respective power class by the PSE 103 informed by the corresponding subset of the data 117A-N. To determine those of the device attributes 119 corresponding to software attributes such as LLDP attributes, the agent 107 analyzes those of the data 117A-N corresponding to LLDP PDUs received on the port 111 after the PSE 103 has completed the handshake with the PD 101 and has begun supplying it with power via the Ethernet cable 105. The agent 107 communicates the device attributes 119 that it determines based on the data 117A-N received on the port 111 to the service 109 (e.g., via the secure connection established therebetween). The agent 107 also communicates an indication of the port 111 (e.g., with a port number/identifier) with the device attributes 119.

At stage B, the agent 107 begins periodically determining and reporting power consumption of the PD 101 to the service 109. Periodic reporting of power consumption can begin upon completion of the handshake between the PD 101. The agent 107 determines power consumption of the PD 101, or an amount of power (e.g., in milliwatts (mW)) delivered to the PD 101 over the Ethernet cable 105 and used to power on the PD 101, at each reporting period and reports the determined power consumption to the service 109. A reporting period can be one of a plurality of fixed time increments, where the length of the time increment is a configurable setting of the agent 107. FIG. 1 depicts the agent 107 as reporting power consumption measurements 121A-N to the service 109, where each of the power consumption measurements 121A-N correspond to a power consumption measurement determined for the PD 101 at a respective time increment. The agent 107 may associate a timestamp with each power consumption measurement that it reports to the service 109.

Periodic reporting of power consumption measurements can be configurable so that the agent 107 reports a first plurality of power consumption measurements at fixed time increments during an initial time window (e.g., every 10 seconds for the first 60 seconds after powering on of the PD 101) to build a baseline power consumption of the PD 101. The agent 107 can report the power consumption measurements corresponding to the initial time window to the service 109 with the device attributes 119. Subsequent reporting of power consumption measurements after the initial time window may be ongoing at fixed time increments or may be performed for at least a second time window. For instance, the agent 107 can determine a second plurality of power consumption measurements at fixed time increments during a second time window having a defined length (e.g., every 60 seconds for a five minute time window). Time window length(s) may be a configurable setting(s) of the agent 107. For illustrative purposes, those of the power consumption measurements 121A-N communicated from the agent 107 to the service 109 along with the device attributes 119 are referred to as "the subset of the power consumption measurements 121A-N," and those reported after the initial reporting of the device attributes 119 and power consumption measurement(s) are referred to as "the subsequent ones of the power consumption measurements 121A-N."

At stage C, the service 109 creates a device profile 123 for the PD 101 based on the device attributes 119 and the subset of the power consumption measurements 121A-N. The device profile 123 in this example indicates the port 111, the device attributes 119, and an average power consumption determined based on the subset of the power consumption measurements 121A-N. In this example, the device profile 123 indicates a set of power attributes, a set of LLDP attributes, and an average power consumption of the PD 101 of 41 Watts (W). The service 109 can determine the average power consumption based on averaging the subset of the power consumption measurements 121A-N. The service 109 may determine additional power consumption statistics based on the subset of the power consumption measurements 121A-N, such as standard deviation. While not depicted in this example, the service 109 can also store the individual power consumption measurements and their corresponding timestamps in association with the device profile 123. The device profile 123 may be a data structure(s) in which the device attributes 119 are stored, structured data (e.g., JavaScript Object Notation (JSON) formatted data), etc. The service 109 inserts the device profile 123 into a repository 115 of device profiles. The repository 115 may be maintained externally to the network controller 113 (e.g., on a physical/virtual server) and accessible to the service 109 or may be locally maintained by the network controller 113.

At stage D, the service 109 updates the device profile 123 with power consumption trends of the PD 101 based on power consumption measurements periodically reported by the agent 107 after initial profile creation. The agent 107 periodically communicates the subsequent ones of the power consumption measurements 121A-N to the service 109. As the service 109 receives each of the subsequent ones of the power consumption measurements 121A-N, the service 109 updates the device profile 123 with updated power consumption measured for the PD 101. Updating the device profile 123 can include determining a second average power consumption for the PD 101 based on the subsequent ones of the power consumption measurements 121A-N such that the device profile 123 comprises an average power consumption by the PD 101 during initial powering up and an average power consumption by the PD 101 during "steady state" operations. As another example, updating the device profile 123 can include recording the subsequent ones of the power consumption measurements 121A-N and their corresponding timestamps in the device profile 123 to generate time series data reflecting trends in power consumption of the PD 101.

Figure 2:
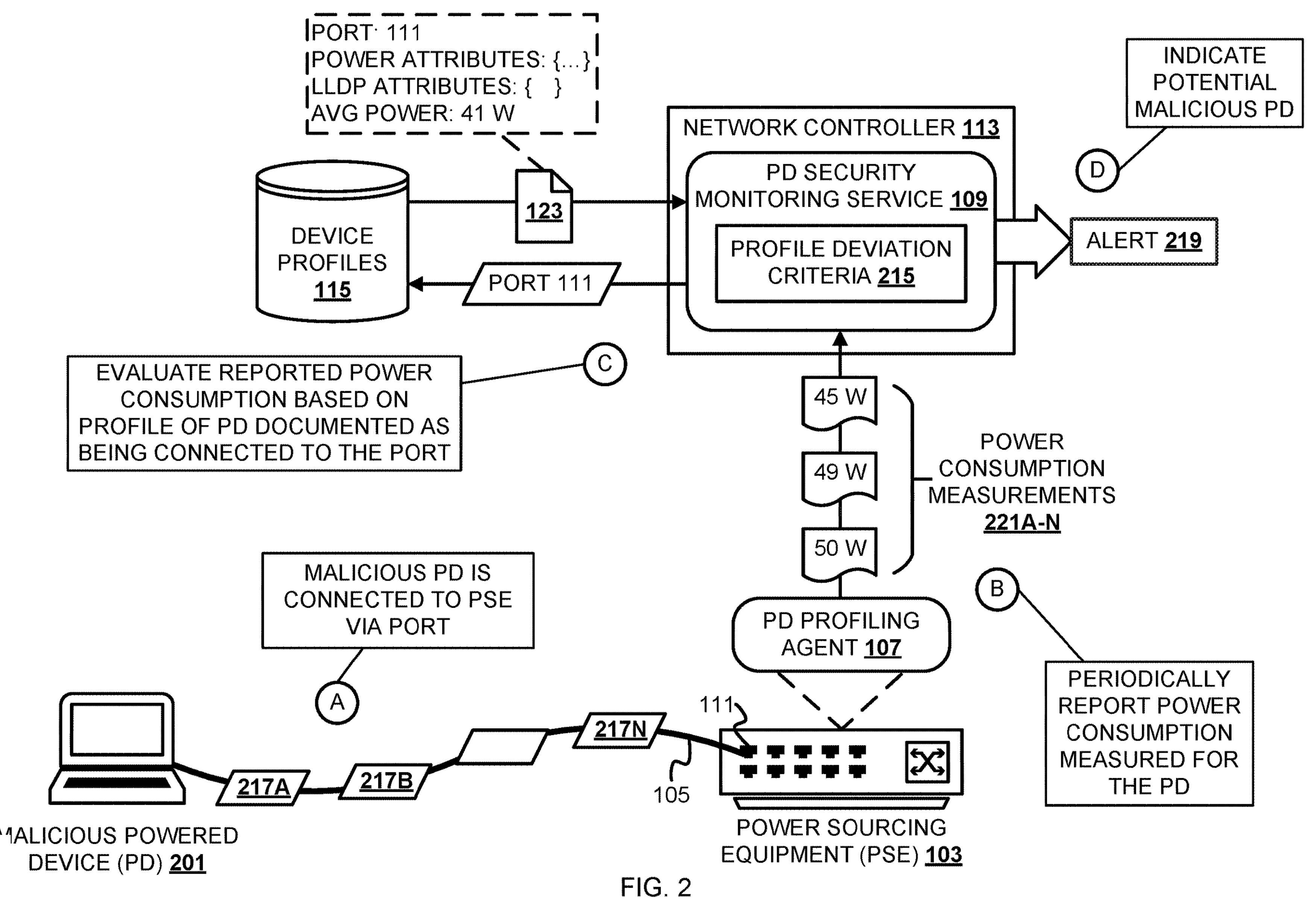
FIG. 2 is a conceptual diagram of detecting changes in PD behavior based on PD profiles and monitored power consumption of connected PDs.

FIG. 2 is a conceptual diagram of detecting changes in PD behavior based on PD profiles and monitored power consumption of connected PDs. FIG. 2 assumes that the device profile 123 has been created and indicates power consumption observed for the PD 101.

FIG. 2 is also annotated with a series of letters A-D. Each letter represents a stage of one or more operations. Although these stages are ordered for this example, the stages illustrate one example to aid in understanding this disclosure and should not be used to limit the claims. Subject matter falling within the scope of the claims can vary from what is illustrated. Additionally, the operations do not necessarily occur sequentially. For instance, the operations corresponding to stages B and C may be performed at least partially in parallel or concurrently.

At stage A, a malicious PD 201 is connected to the PSE 103 on the port 111. This example assumes that the PD 101 was disconnected from the Ethernet cable 105 and replaced with the malicious PD 201 (e.g., as part of an attempt to breach the network that is accessible via the PSE 103). The malicious PD 201 completes a handshake with the PSE 103 and is powered on after the PSE 103 detects and classifies the malicious PD 201 during completion of the handshake. FIG. 2 depicts data 217A-N sent over the Ethernet cable 105 that the PSE 103 receives on the port 111. The data 217A-N in this example are assumed to include hardware-level power data communicated over the Ethernet cable 105 during a PoE handshake between the malicious PD 201 and PSE 103. The data 217A-N can also comprise LLDP PDUs transmitted by the malicious PD 201 that may spoof LLDP PDUs of the PD 101 to bypass detection via inspection of LLDP attributes.

At stage B, the agent 107 periodically reports power consumption measured for the PD connected to the port 111 to the service 109. The agent 107 determines power consumed by the malicious PD 201 at a plurality of time increments as similarly described in reference to FIG. 1. In this example, the agent 107 collects power consumption measurements 221A-N, depicted as including wattages of 45 W, 49 W, and 50 W, which correspond to power consumption measurements determined by the agent 107 for the port 111 at each of N time increments (e.g., each minute). The agent 107 also associates an indication of the port 111 and respective timestamps with the power consumption measurements 221A-N. While not depicted in FIG. 2 for simplicity, the agent 107 may also send other attributes (e.g., power attributes and/or LLDP attributes) determined based on at least a subset of the data 217A-N to the service 109 with one or more of the power consumption measurements 221A-N.

At stage C, the service 109 evaluates the power consumption measurements reported by the agent 107 based on the device profile 123. As the service 109 obtains each of the power consumption measurements 221A-N, the service 109 queries the repository 115 for the device profile corresponding to the port 111 to retrieve the device profile 123. The service 109 evaluates each power consumption measurement and the power consumption data recorded in the device profile 123 based on profile deviation criteria ("criteria") 215. The criteria 215 comprise one or more criteria for determining that the data obtained for a PD connected to a port (i.e., a subset of the attributes and/or power consumption data) substantially deviate from that of the "known" PD of the port, or that for which the profile was initially created, and thus indicate that the PD may have been replaced. As an example, the criteria 215 can comprise a threshold against which a difference between the average power consumption recorded in or determined from the device profile 123 and an average of the last N reported power consumption measurements is evaluated. To illustrate, the service 109 may average the power consumption measurements 221A-N, compare the average to the power consumption average recorded in the device profile 123, and determine if the difference between the most recently observed average and the previously observed average satisfies the criteria 215 (e.g., exceeds a threshold, is within M standard deviations of the average, etc.) and thus constitutes a substantial deviation. This example assumes that the service 109 determines that the criteria 215 are satisfied and thus identifies a substantial deviation in power consumption from expected levels observed for the port 111.

At stage D, the service 109 indicates that a potentially malicious PD has been connected to the PSE 103 on the port 111. The satisfaction of the criteria 215 resulting from evaluating the power consumption measurements 221A-N based on the average power consumption recorded in the device profile 123 triggers detection of a change for the port 111. The service 109 generates an alert 219 to indicate that the PD connected to the port 111 has potentially been replaced with a malicious PD. The alert 219 indicates the port 111 and may further indicate power consumption measurements that contributed to detection of the potentially malicious PD. The power consumption measurements obtained for the port 111 and/or the physical connection of a PD to the port 111 itself can be further investigated to determine the underlying cause of the change detected for the port 111, such as to determine if the newly connected PD (i.e., the malicious PD 210) is a known PD or can be confirmed to be malicious.

FIG. 2 depicts an example in which the device profile 123 comprises an average power consumption measurement computed for a PD and based on which subsequently reported power consumption measurements are evaluated. Implementations can utilize a variety of techniques for evaluation of power consumption measurements based on previously observed trends in power consumption of a PD. For instance, the device profile 123 can comprise power consumption measurements in the form of time series data, where each power consumption measurement and a corresponding timestamp are stored in association with the device profile 123. The service 109 may determine if an average of the power consumption measurements reported during a most recent time window (e.g., the last five minutes) substantially deviates from an average of the power consumption measurements stored in the device profile during a prior time window. In this case, the service 109 determines average power consumption measurements during proximate time windows, which may or may not be of the same length of time, and evaluates the average power consumption measurements based on the profile deviation criteria 215.

As another example, the service 109 can create a plurality of power consumption profiles of which the device profile 123 is comprised. For instance, as the service 109 receives periodically reported power consumption measurements for the PD 101, the service 109 can build a power consumption profile comprising power consumption statistics (e.g., average and standard deviation) for a five minute time window, a one day time window, a one week time window, a 30 day time window, etc., where the beginning of the time window is measured from initial connection and powering up of the PD 101 to the port 111. Maintenance of multiple power consumption profiles for the PD 101 can inform determination by the service 109 of whether a new PD has been connected to the port 111 or if the known PD having a profile created in association with the port 111 has been disconnected and re-connected. For instance, at stage C of FIG. 2, the service 109 may evaluate reported power consumption measurements based on those of the power consumption statistics of the device profile 123 determined during the initial powering on time window of the PD. If the power consumption measurements do not deviate from this subset of the device profile 123, the service 109 may continue to collect power consumption measurements for the next time window for which a power consumption profile is maintained (e.g., the next five minutes). The service 109 can then compare the average power consumption measured during this time window with that of the corresponding time window length in the device profile 123 to determine if the criteria 215 are satisfied. This can continue for each time window length represented in the device profile 123 until each profile is compared without detection of a deviation or until the criteria 215 are satisfied for one of the time windows.

FIGS. 1 and 2 depict reporting of power consumption measurements by the agent 107 as part of building a profile of a PD and reporting of power consumption measurements during PD anomaly detection separately to aid in understanding. In implementations, evaluating reported power consumption measurements and updating a PD profile with the reported power consumption measurements can be performed together. In other words, the service 109 can evaluate power consumption measurements reported by the agent 107 for the PD 101 based on the criteria 215. If a power consumption measurement does not satisfy the criteria 215 and is thus consistent with the device profile 123, the service 109 can update the device profile 123 with the power consumption measurement (e.g., through insertion into time series data, updating an average power consumption statistic, etc.).

Figure 3:
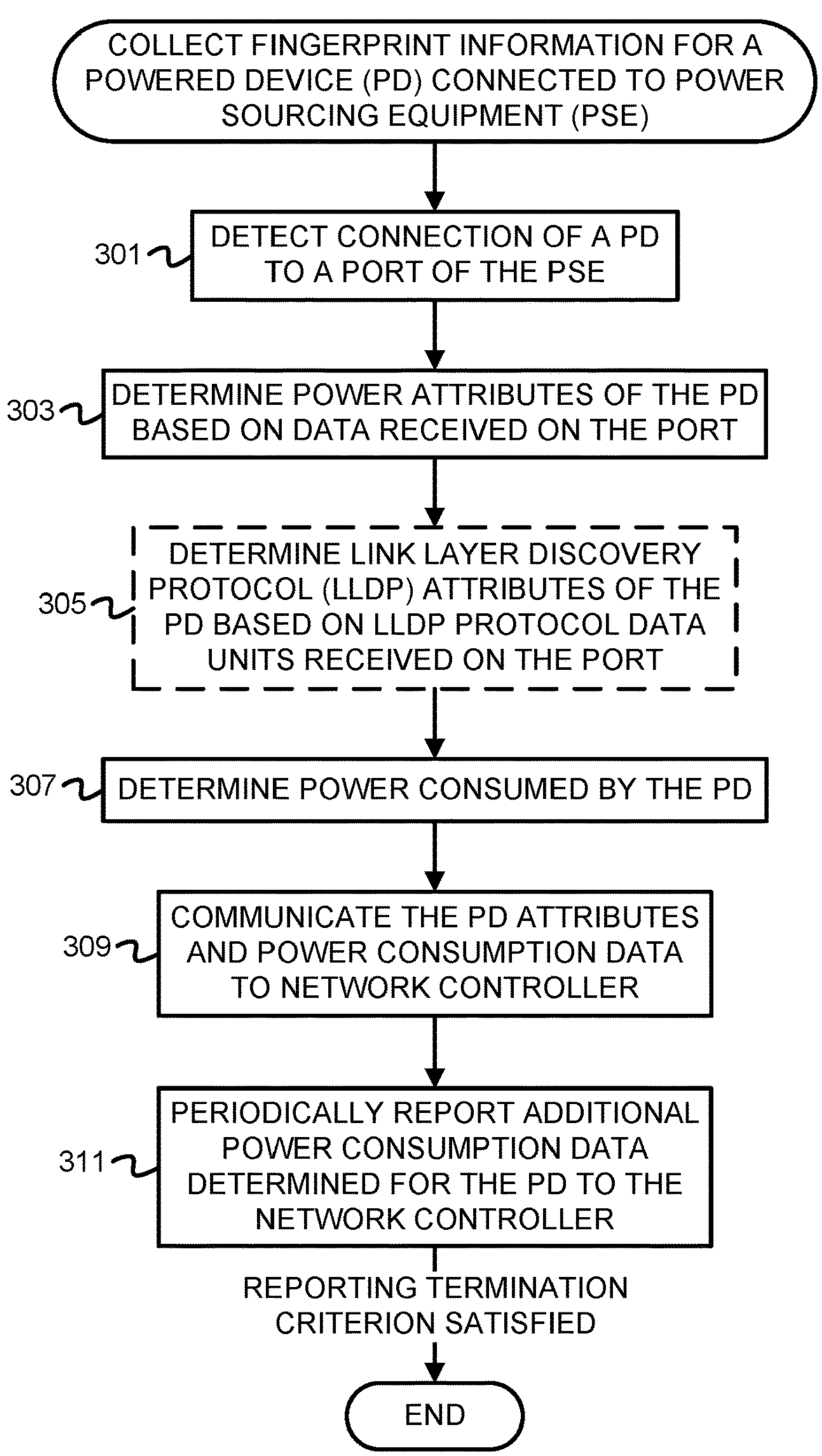
FIG. 3 is a flowchart of example operations for collecting fingerprint information for a PD connected to PSE.
Figure 4:
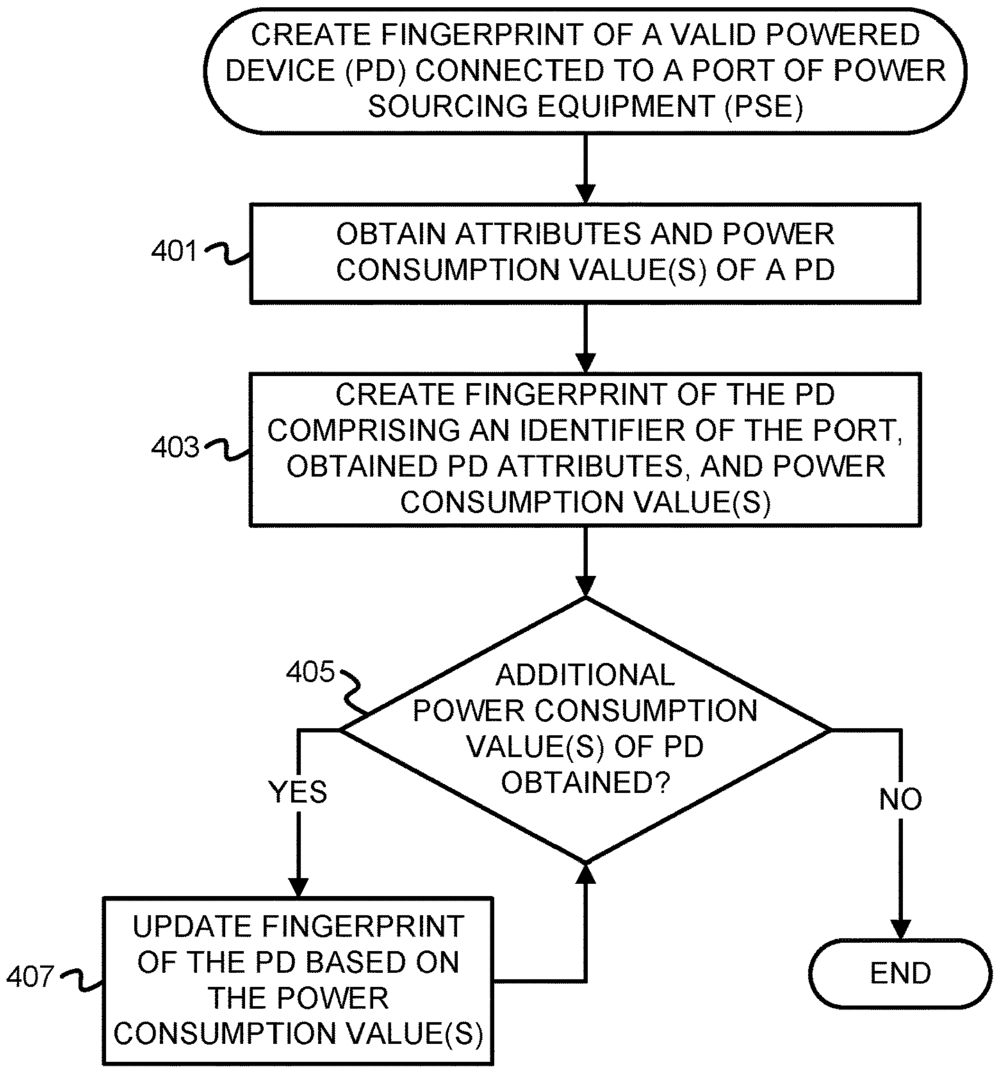
FIG. 4 is a flowchart of example operations for creating a fingerprint of a valid PD connected to a port of PSE.
Figure 5:
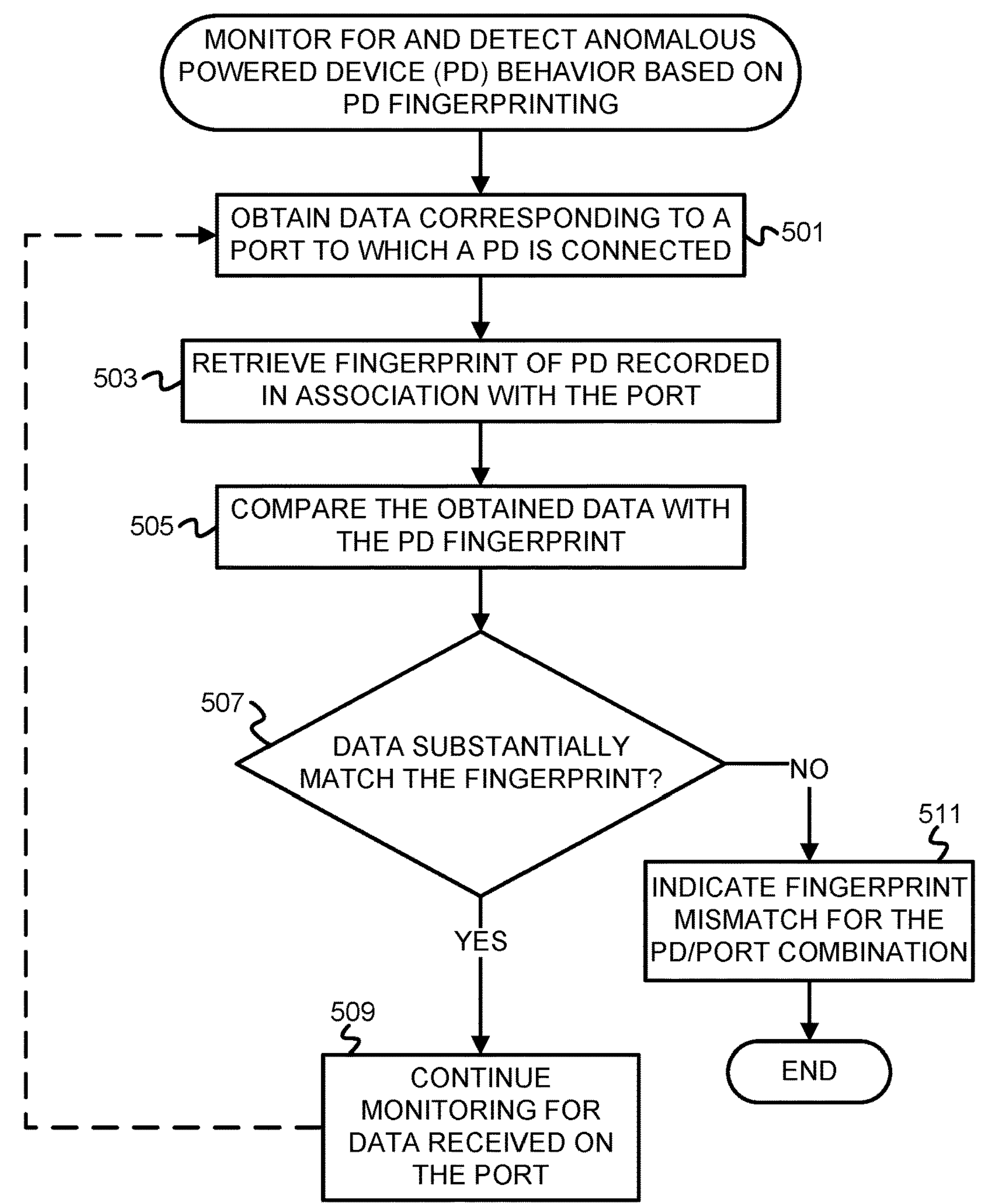
FIG. 5 is a flowchart of example operations for monitoring for and detecting anomalous PD behavior based on PD fingerprinting.

FIGS. 3-5 are flowcharts of example operations. The example operations are described with reference to a PD profiling agent and a PD security monitoring service (hereinafter "the agent" and "the service," respectively) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for collecting fingerprint information for a PD connected to PSE. The example operations assume that an agent executes on the PSE.

At block 301, the agent detects connection of a PD to a port of the PSE. Detection of the connection can be based on the PSE initiating a POE handshake with the PD and detecting connection of the PD during the detection stage of the handshake.

At block 303, the agent determines power attributes of the PD based on data received on the port. Power attributes of the PD can include power class type, whether the PD is a single-signature PD or a dual-signature PD, requested class for the signal channel and/or spare channel, power pair control ability, power pair state, and/or nominal power consumed. The agent can determine the power attributes based on data received on the port as part of completion of a handshake between the PD and the PSE for negotiation of power (the "PoE handshake") or based on other Ethernet frames delivered on the port 111 that indicate power requirements of the PD. For instance, the agent can detect classification of the PD by the PSE and determine the power attributes accordingly.

At block 305, the agent determines LLDP attributes of the PD based on LLDP PDUs received on the port. Block 305 is depicted with dashed lines because determining LLDP attributes is optional; in other words, PD fingerprints may include power attributes or power attributes and LLDP attributes. The agent determines the LLDP attributes from known TLV elements of LLDP PDUs received on the port. Examples of LLDP attributes that the agent can identify in received PDUs include chassis identifier, device class, device description, device name, manufacturer name, model name, serial number, hardware/software/firmware revisions, power source, power requirement, link aggregation information, and/or link aggregation capability.

At block 307, the agent determines the amount of power consumed by the PD. The agent determines the amount of power being supplied to the PD on the port to which it is connected (e.g., in mW). The agent may determine a plurality of power consumption values during an initial period of powering on of the PD. For instance, the agent may determine a power consumption value (i.e., a wattage) at each of a plurality of time increments following powering on the PD, where the number of time increments corresponds to a time window during which power consumption values are to be initially collected (e.g., a five minute window).

At block 309, the agent communicates the PD attributes and power consumption data to a network controller. The agent associates an indication of the port to which the PD is connected (e.g., a port identifier) with the PD attributes and power consumption data. The power consumption data can comprise one or more power consumption values and a corresponding timestamp(s).

At block 311, the agent periodically reports additional power consumption data determined for the PD. The agent determines power consumed by the PD at fixed time increments (e.g., every 30 seconds, every minute, etc.), where the length of the time increment can be a configurable setting of the agent. The agent can then report the determined power consumption and a corresponding timestamp to the network controller. The agent may report each power consumption value to the PD. As another example, reporting of a power consumption value may be subject to the power consumption value satisfying a reporting criterion. For instance, the agent may determine a baseline power consumption of each connected PD, such as during the initial determination of a power consumption value(s) at block 307. As the agent periodically determines power consumption values for a PD, the agent may evaluate each power consumption value based on the baseline determined for that PD to determine if the reporting criterion is satisfied. The reporting criterion may comprise a threshold corresponding to expected variation in power consumption during operation of a PD (e.g., 0.01 W or 0.05 W). In this case, the agent determines if a difference between a power consumption value and the baseline exceeds the threshold and thus satisfies the reporting criterion. Periodic reporting of power consumption data can be ongoing until the agent detects satisfaction of a reporting termination criterion, such as completion of a designated reporting time window (e.g., 30 days) or disconnection of the PD from the port.

FIG. 4 is a flowchart of example operations for creating a fingerprint of a valid PD connected to a port of PSE. The PD is referred to as valid because the example operations assume that the PD has completed a PoE handshake with the PSE and is thus being supplied with power.

At block 401, the service obtains attributes and one or more power consumption values of a PD. The attributes of the PD at least comprise power attributes of the PD, such as power class determined by the PSE or an indication of whether the PD is a single-signature PD or a dual-signature PD. The power consumption values may comprise a set of power consumption values determined after powering on of the PD at a plurality of time increments during an initial time window (e.g., values determined during each minute for the first five minutes after PoE handshake completion). The attributes of the PD can further comprise software-level attributes of the PD, such as LLDP attributes.

At block 403, the service creates a fingerprint of the PD comprising an identifier of the port and the obtained attributes and power consumption value(s) of the PD. In implementations, PD fingerprints that the service creates can include hardware-based power attributes or a combination of power attributes and software attributes (e.g., LLDP attributes). The port identifier should have been communicated with the attributes and power consumption value(s). The fingerprint can be created with a data structure(s) in which the attributes and power consumption value(s) are stored, structured data comprising the attributes and the power consumption values as field-value pairs, or another format that is stored in a database maintained by or accessible to the service. Power consumption values can be represented in the fingerprint with time series data and/or one or more power consumption statistics that the service computes, such as average power consumption and standard deviation. Generally, fingerprints of PDs that the service creates should at a minimum include hardware-level power attributes of the PD and power consumption data, such as average power consumption and/or time series data comprising measured power consumption.

At block 405, the service determines if an additional power consumption value(s) is obtained for the PD. Power consumption values that correspond to the PD are those that indicate the port to which the PD is connected. The service can perform updates to the fingerprint of the PD as additional power consumption values that correspond to the port are obtained periodically (e.g. from the agent). With reference to FIG. 3, periodic reporting of power consumption values to the service can occur as described at block 311. If an additional power consumption value is obtained, operations continue at block 407. Otherwise, operations are complete.

At block 407, the service updates the fingerprint of the PD based on the power consumption value(s). Updating a fingerprint with additional power consumption values can be achieved by updating time series data of reported power consumption values with each power consumption value and its timestamp. As another example, updating a fingerprint can include updating or computing additional power consumption statistics for the PD. The service may compute the average power consumption value from the last N power consumption values, or those obtained during a time window of a designated size. Fingerprints can comprise multiple average power consumption values corresponding to different time windows. For instance, the service may have determined an average power consumption value corresponding to initial device powering up at block 403. Subsequent power consumption values may represent steady operation of the PD, the average power consumption for which the service records separately in the PD. Operations continue at block 405, where the service waits for additional power consumption measurements of the PD (if any).

FIG. 5 is a flowchart of example operations for monitoring for and detecting anomalous PD behavior based on PD fingerprinting. The example operations can occur after a PD has been fingerprinted as described in reference to FIGS. 3 and 4, where a fingerprint of a PD comprises device attributes (including power attributes) of the PD and power consumption statistics of the PD (e.g., average power consumption value(s), time series data comprising power consumption values obtained at corresponding times, etc.).

At block 501, the service obtains data corresponding to a port to which a PD is connected. The obtained data at least comprise a power consumption value determined for the port and indicate the port for which the power consumption was measured. The obtained data may also indicate one or more attributes of the PD, such as hardware-level and/or software-level attributes determined based on data received on the port.

At block 503, the service retrieves fingerprint data of a PD recorded in association with the port. The service can query a repository of fingerprint data with the indication of the port to obtain the fingerprint data created for the known PD corresponding to the port, or the PD that is known to be connected to the port.

At block 505, the service compares the obtained data with the PD fingerprint. The service at least compares the obtained power consumption value(s) with the power consumption value(s) indicated in the PD fingerprint. For instance, the service can compare the obtained power consumption value with an average of the last N power consumption values indicated in the PD fingerprint or an average power consumption value indicated in the PD fingerprint. As an example, for implementations where the fingerprint comprises time series data for power consumption measurements, the service may determine a subset of the time series data that comprises the N most recent power consumption measurements and compare the obtained power consumption value or an average of the obtained power consumption values with an average of the N most recent power consumption measurements. Further, the service may determine the subset of the time series data based on which to evaluate the obtained power consumption value(s) based on a time associated with the obtained data. To illustrate, the service may retrieve a subset of power consumption measurements (e.g., those corresponding to a time window of a designated length) that correspond to a same time of day as the obtained data based on a timestamp associated with the obtained data. If the obtained data also indicate one or more attributes of the connected PD, the service may compare the received attributes with those recorded in the PD fingerprint.

At block 507, the service determines if the data substantially match the fingerprint. Determining if the data substantially match the fingerprint can comprise determining if the obtained power consumption value substantially matches the power consumption value determined based on the PD fingerprint. The service can determine power consumption values to substantially match if an absolute value of the difference between the values is below a threshold (e.g., a threshold corresponding to a standard deviation from the average power consumption). Differences that exceed the threshold thus trigger a determination that the obtained power consumption value substantially differs/deviates from that of the fingerprint. If the obtained data also included one or more attributes, the service compares the obtained attributes with those recorded in the PD fingerprint. Obtained attributes can be considered to substantially match the fingerprint attributes if they are equivalent (e.g., based on having matching values). If the data substantially match the PD fingerprint, operations continue at block 509. If the data do not substantially match the PD fingerprint, operations continue at block 511.

At block 509, the service continues monitoring for data received on the port. The service may additionally store the reported power consumption measurement and an indication of the corresponding time (e.g., a timestamp) in association with the PD fingerprint. Operations continue at block 501 if/when the service obtains additional data corresponding to the port.

At block 511, the service indicates the fingerprint mismatch for the PD/port combination. Indicating the fingerprint mismatch can include generating a notification or alert, communicating the notification or alert to a recipient entity (ies), displaying the notification or alert on a GUI, etc. The service at least indicates the port for which the fingerprint mismatch was identified. The service may further indicate the data attributable to the fingerprint mismatch, such as the power consumption values that triggered the mismatch identification and/or the differing attributes.

Fingerprint mismatches may be attributable to different causes that can be inferred from further evaluation. For instance, differences in both hardware-level attributes and software-level attributes may be indicative that the PD for which the profile was created has been disconnected and replaced with a different PD. Substantial differences in power consumption that are observed without any change in software-level attributes (if any) may be benign, such as due to a software update occurring for the connected, known PD that causes a temporary fluctuation in power consumption (e.g., due to rebooting of the device after update installation). Such benign differences can be identified based on analyzing power consumption data corresponding to a plurality of time increments (e.g., during the past hour). For instance, a decline in power consumption to zero followed by a return to the recorded baseline (or substantially similar thereto) reflected in the power consumption data may be reflective of a benign cause for the fingerprint mismatch. In other cases, substantial differences in power consumption may be attributable to a malicious PD replacing the known PD on the port. A rapid increase or decrease in observed power consumption that is not accompanied by an indicator of a benign event (e.g., a drop to zero as in the case of the software update event) may indicate that the PD has been replaced with a malicious PD. In this case, differences in software-level attributes may not be observed since the malicious PD may spoof PDUs of the prior-connected PD to attempt to bypass detection.

Variations

As described above, profile deviations/fingerprint mismatches for PDs connected to PSE are detected based on identifying substantial deviations in power consumption by a PD from the power consumption data maintained in the PD profile/fingerprint and/or changes in device attributes from those maintained in the PD profile/fingerprint. Implementations may additionally utilize machine learning to detect potentially malicious PDs, such as with machine learning techniques for anomaly detection. For instance, with reference to FIG. 1, the service 109 may utilize a clustering model (i.e., a machine learning model that uses a clustering algorithm to cluster data) for outlier detection to detect potentially malicious PDs. To illustrate, the service 109 may determine PD profile data, or device attributes and power consumption, from data periodically reported by the agent 107 and input the profile data into a clustering model. As the service 109 builds clusters comprising data points that correspond to PD profile data, the service 109 can determine whether any of the PDs represented by profile data are outliers, such as based on analyzing distances between the data points and the centroid of their respective cluster. PDs corresponding to data points that are identified as outliers can be reported as potentially malicious as described above.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 5 can be performed in parallel or concurrently as data corresponding to different ports are obtained. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
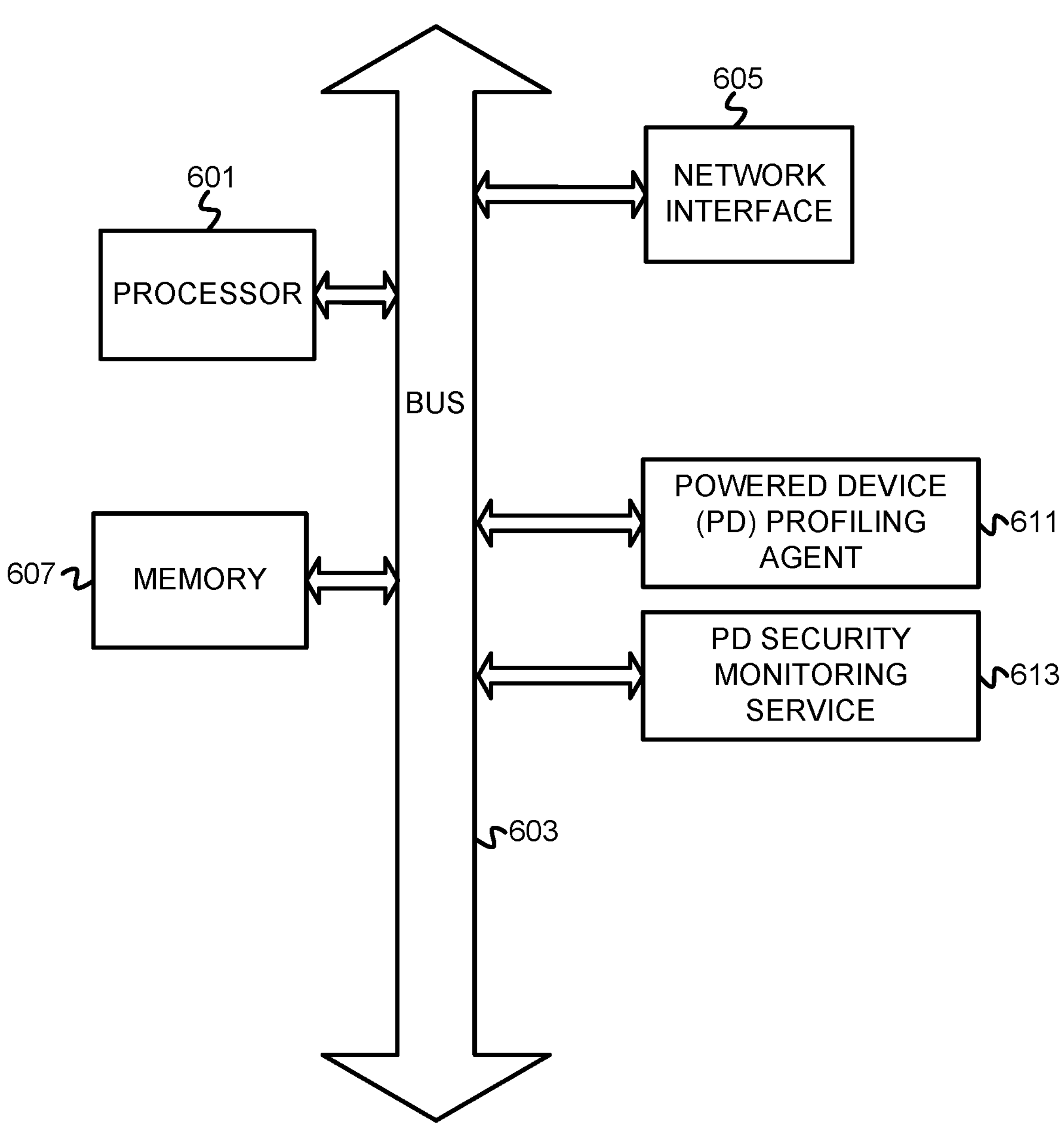
FIG. 6 depicts an example computer system with a PD profiling agent and a PD security monitoring service.

FIG. 6 depicts an example computer system with a PD profiling agent and a PD security monitoring service. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes PD profiling agent 611 and PD security monitoring service 613. The PD profiling agent 611 reports device attributes and power consumption data of PDs based on data received on Ethernet ports having PDs connected to the PD security monitoring service 613. The PD security monitoring service 613 builds profiles of PDs and monitors for deviations from PD profiles that may be indicative of a security issue, including substantial deviations from trends in power consumption recorded for a PD. Though depicted as part of the same system in FIG. 6, the PD profiling agent 611 and PD security monitoring service 613 do not necessarily execute as part of the same system. For instance, the PD profiling agent 611 may execute on PSE, and the PD security monitoring service 613 may execute on another physical/virtual server or network component (e.g., an SD-WAN controller). Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

The invention claimed is:

1. A method comprising:

creating a profile of a powered device (PD) connected to power sourcing equipment (PSE) based on first data received on a port of the PSE to which the PD is connected, wherein the profile of the PD comprises, a first plurality of device attributes, wherein the first plurality of device attributes comprises attributes determined based on at least one of Ethernet frames, data exchanged during a handshake, and Link Layer Discover Protocol (LLDP) attributes determined based on LLDP protocol data units (PDUs), and a plurality of power consumption measurements identified during a period of powering the PD;

evaluating second data received on the port based on the profile of the PD for deviations in the second data from the profile of the PD, wherein the second data comprise one or more power consumption measurements and a second plurality of device attributes, and wherein evaluating the second data against the profile of the PD comprises determining whether the one or more power consumption measurements of the second data indicate a rapid increase or decrease in power consumption not accompanied by an indication of a benign event based on comparing the one or more power consumption measurements and the second plurality of device attributes to the plurality of power consumption measurements and the first plurality of device attributes indicated in the profile of the PD; and based on determining that the second data received on the port deviate from the profile of the PD, indicating a deviation for the PD, wherein indicating the deviation for the PD comprises indicating that the PD has potentially been compromised, wherein determining that the second data received on the port deviate from the profile of the PD comprises determining that the one or more power consumption measurements indicate a rapid increase or decrease in power consumption not accompanied by an indication of a benign event.

2. The method of claim 1, wherein evaluating the one or more power consumption measurements for deviations in the second data from the profile of the PD further comprises;

comparing the one or more power consumption measurements to a subset of the plurality of power consumption measurements; and determining if the one or more power consumption measurements substantially deviate from the subset of power consumption measurements, wherein determining that the second data deviate from the profile of the PD further comprises determining that the one or more power consumption measurements substantially deviate from the subset of power consumption measurements.

3. The method of claim 2, wherein determining if the one or more power consumption measurements substantially deviate from the plurality of power consumption measurements comprises determining if a difference between an average of the one or more power consumption measurements and an average of the subset of power consumption measurements exceeds a threshold.

4. The method of claim 2, wherein the one or more power consumption measurements correspond to a first time window and the subset of power consumption measurements correspond to a second time window.

5. The method of claim 4, wherein the second time window is proximate to the first time window.

6. The method of claim 4, wherein the first time window and the second time window correspond to a same length of time.

7. The method of claim 1, wherein determining if the second data received on the port deviate from the profile of the PD further comprises determining if the second plurality of device attributes match the first plurality of device attributes.

8. The method of claim 1, wherein the LLDP attributes comprise at least one of a chassis identifier, device class, device description, manufacturer name, model name, power source, and link aggregation information.

9. The method of claim 1, wherein indicating that the PD has potentially been compromised comprises generating an alert indicating the port and power consumption measurements for display to a user on a graphical user interface.

10. One or more non-transitory machine-readable media having program code stored thereon, the program code comprising instructions to:

determine a Power over Ethernet (POE) fingerprint for a powered device (PD) connected to a port of power sourcing equipment (PSE) to which the PD is connected via Ethernet cabling and monitor PoE data corresponding to the PD for mismatches from the PoE fingerprint;

wherein the instructions to determine the PoE fingerprint for the PD comprise instructions to determine a set of device attributes and a set of power consumption measurements for inclusion in the PoE fingerprint based on first data received on the port of the PSE, wherein the first data received on the port of the PSE comprise at least one of Ethernet frames, data transmitted via the Ethernet cabling during a handshake between the PD and the PSE, and Link Layer Discovery Protocol (LLDP) protocol data units (PDUs), wherein the instructions to monitor the PoE data comprise instructions to evaluate subsequent sets of PoE data corresponding to the PD to determine whether at least one of a device attribute has changed from the set of device attributes indicated in the fingerprint and one or more power consumption measurements have substantially changed from the set of power consumption measurements indicated in the fingerprint, wherein the instructions to evaluate subsequent sets of PoE data corresponding to the PD further comprise instructions to determine whether the one or more power consumption measurements indicate a rapid increase or decrease in power consumption not accompanied by an indication of a benign event based on comparison of the one or more power consumption measurements and the set of power consumption measurements indicated in the fingerprint; and based on a determination that at least one of a device attribute has changed and one or more power consumption measurements has changed substantially, indicate a fingerprint mismatch for the port of the PSE and that the PD has potentially been compromised, wherein the instructions to indicate the fingerprint mismatch comprise instructions to determine that the subsequent sets of PoE data corresponding to the PD indicate a rapid increase or decrease in power consumption not accompanied by an indication of a benign event.

11. The non-transitory machine-readable media of claim 10, wherein the instructions to determine whether the one or more power consumption measurements have substantially changed from the set of power consumption measurements indicated in the fingerprint further comprise instructions to;

compare the one or more power consumption measurements and a first power consumption measurement identified from the fingerprint, wherein the first power consumption measurement is an average power consumption of the set of power consumption measurements; and determine whether a difference between the one or more power consumption measurements and the first power consumption measurement exceeds a threshold, wherein the instructions to determine that the one or more power consumption measurements have substantially changed further comprise instructions to determine that the difference exceeds the threshold.

12. The non-transitory machine-readable media of claim 10, wherein the set of power consumption measurements corresponds to a first time window and the one or more power consumption measurements correspond to a second time window, wherein the second time window is at least one of a same length of time as the first time window and proximate to the first time window.

13. The non-transitory machine-readable media of claim 10, wherein the set of device attributes comprises LLDP attributes determined based on the LLDP PDUs exchanged during the handshake, wherein the LLDP attributes comprise at least one of a chassis identifier, device class, device description, manufacturer name, model name, power source, and link aggregation information.

14. An apparatus comprising:

a processor; and a machine-readable medium having instructions stored thereon that are executable by the processor to cause the apparatus to, create a profile of a powered device (PD) connected to a port of power sourcing equipment (PSE) via Ethernet cabling based on first data received on the port, wherein the profile of the PD comprises a first plurality of device attributes and first power consumption data collected for the PD, wherein the instructions to create the profile of the PD comprise instructions to create the profile based on identification of the first plurality of device attributes from the at least one of Ethernet frames, power data, and Link Layer Discovery Protocol (LLDP) protocol data units (PDUs) exchanged during a handshake between the PD and PSE;

evaluate second data received on the port based on the profile of the PD to determine if the second data substantially differ from the profile of the PD, wherein the second data comprise second power consumption data and a second plurality of device attributes, and wherein the instructions to evaluate the second data against the profile of the PD comprise instructions to determine whether the second power consumption data indicates a rapid increase or decrease in power consumption not accompanied by an indication of a benign event based on comparison of the second power consumption data and second plurality of device attributes and the first power consumption data and the first plurality of device attributes indicated in the profile of the PD; and based on a determination that the second data received on the port substantially differ from the profile of the PD, generate an alert for the PD as potentially being compromised, wherein the instructions executable by the processor to generate the alert for the PD as potentially being compromised comprise instructions executable by the processor to cause the apparatus to determine that the second power consumption data indicates a rapid increase or decrease in power consumption not accompanied by an indication of a benign event.

15. The apparatus of claim 14, wherein the instructions to evaluate the second power consumption data to determine if the second data substantially differ from the profile of the PD comprise instructions executable by the processor to cause the apparatus to;

compare the second power consumption data to the first power consumption data; and determine if the second power consumption data substantially differ from the first power consumption data.

16. The apparatus of claim 15, wherein the first power consumption data comprise a first power consumption measurement and the second power consumption data comprise a second power consumption measurement, wherein the instructions to determine if the second power consumption data substantially differ from the first power consumption data comprise instructions executable by the processor to cause the apparatus to determine if a difference between the first and second power consumption measurements exceeds a threshold.

17. The apparatus of claim 16 further comprising instructions executable by the processor to cause the apparatus to determine the first power consumption measurement based on a plurality of power consumption measurements obtained for the PD based on averaging the plurality of power consumption measurements.

18. The apparatus of claim 14, wherein the first power consumption data correspond to a first time window and the second power consumption data correspond to a second time window, wherein the second time window is at least one of a same length of time as the first time window and proximate to the first time window.

19. The apparatus of claim 14, wherein the second data comprise a second plurality of device attributes, wherein the instructions to determine if the second data substantially differ from the profile comprise instructions executable by the processor to cause the apparatus to determine if the first and second plurality of device attributes match.

20. The apparatus of claim 14, wherein the first plurality of device attributes comprises LLDP attributes determined based on the LLDP PDUs exchanged during the handshake, wherein the LLDP attributes comprise at least one of a chassis identifier, device class, device description, manufacturer name, model name, power source, and link aggregation information.

* * * * *